US008175659B2

(12) United States Patent
Toyoda et al.

(10) Patent No.: US 8,175,659 B2
(45) Date of Patent: May 8, 2012

(54) MOBILE TERMINAL DEVICE AND NETWORK CONNECTION CONTROL METHOD

(75) Inventors: Kiyoshi Toyoda, Hachioji (JP); Takahisa Endo, Tachikawa (JP)

(73) Assignee: Olympus Corporation, Tokyo (JP)

( * ) Notice: Subject to any disclaimer, the term of this patent is extended or adjusted under 35 U.S.C. 154(b) by 821 days.

(21) Appl. No.: 12/163,238

(22) Filed: Jun. 27, 2008

(65) Prior Publication Data

US 2009/0002546 A1    Jan. 1, 2009

(30) Foreign Application Priority Data

Jun. 28, 2007    (JP) ................................ 2007-170835

(51) Int. Cl.
*H04B 1/38* (2006.01)
*H04B 1/40* (2006.01)
*H04M 1/00* (2006.01)
*H04N 5/225* (2006.01)
*H04N 5/232* (2006.01)

(52) U.S. Cl. ................. 455/572; 348/207.1; 348/211.99; 348/211.2; 348/372; 455/74.1; 455/556.1; 455/573; 455/574

(58) Field of Classification Search .................. 348/372, 348/207.1–207.2; 455/3.01–3.06, 418–420, 455/334, 343.1–343.6, 73–74.1, 88, 550.1, 455/556.1–556.2, 557–558, 572–574; 379/102.01–102.04; 340/333
See application file for complete search history.

(56) References Cited

U.S. PATENT DOCUMENTS

| 6,954,660 | B2 * | 10/2005 | Aoyama | 455/572 |
|---|---|---|---|---|
| 7,656,439 | B1 * | 2/2010 | Manico et al. | 348/231.3 |
| 7,885,537 | B1 * | 2/2011 | Kuss | 396/374 |
| 7,899,418 | B2 * | 3/2011 | Ishiyama et al. | 455/127.1 |
| 2002/0082059 | A1 * | 6/2002 | Nariai et al. | 455/573 |
| 2006/0025105 | A1 | 2/2006 | Sato | |
| 2006/0046704 | A1 * | 3/2006 | Hori et al. | 455/418 |
| 2006/0221881 | A1 * | 10/2006 | Morisawa | 370/311 |
| 2007/0013801 | A1 * | 1/2007 | Sezan et al. | 348/333.01 |

(Continued)

FOREIGN PATENT DOCUMENTS

JP    62-272829 A    11/1987

(Continued)

OTHER PUBLICATIONS

Japanese Office Action dated Nov. 1, 2011, issued in corresponding Japanese Patent Application No. 2007-170835.

*Primary Examiner* — Jason Chan
*Assistant Examiner* — Michael Osinski
(74) *Attorney, Agent, or Firm* — Westerman, Hattori, Daniels & Adrian, LLP

(57) ABSTRACT

A mobile terminal device includes a wireless communication interface and a wired communication interface. The device further includes a wired communication determination unit configured to determine whether or not communication with a network by the wired communication interface, an external power source supply unit configured so as to be supplied power from the outside for charge or replacement of a built-in battery, a power supply state detection unit configured to detect that a state, in which power is supplied from the outside to the external power source supply unit, is attained, and a control unit configured to set a state in which the wireless communication interface is available regardless a determination result of the wired communication determination unit after the power supply state detection unit detects the state in which the power is supplied from the outside.

17 Claims, 8 Drawing Sheets

U.S. PATENT DOCUMENTS

| | | | |
|---|---|---|---|
| 2007/0081486 A1* | 4/2007 | Koide | 370/328 |
| 2007/0130268 A1* | 6/2007 | Tsuji | 709/206 |
| 2007/0196099 A1* | 8/2007 | Ishiyama et al. | 396/301 |
| 2007/0287509 A1* | 12/2007 | Izumi et al. | 455/573 |
| 2009/0002547 A1* | 1/2009 | Endo et al. | 348/372 |

FOREIGN PATENT DOCUMENTS

| | | |
|---|---|---|
| JP | 2007-28176 A | 2/2007 |
| JP | 2007-104607 A | 4/2007 |
| JP | 2008-310094 A | 12/2008 |

* cited by examiner

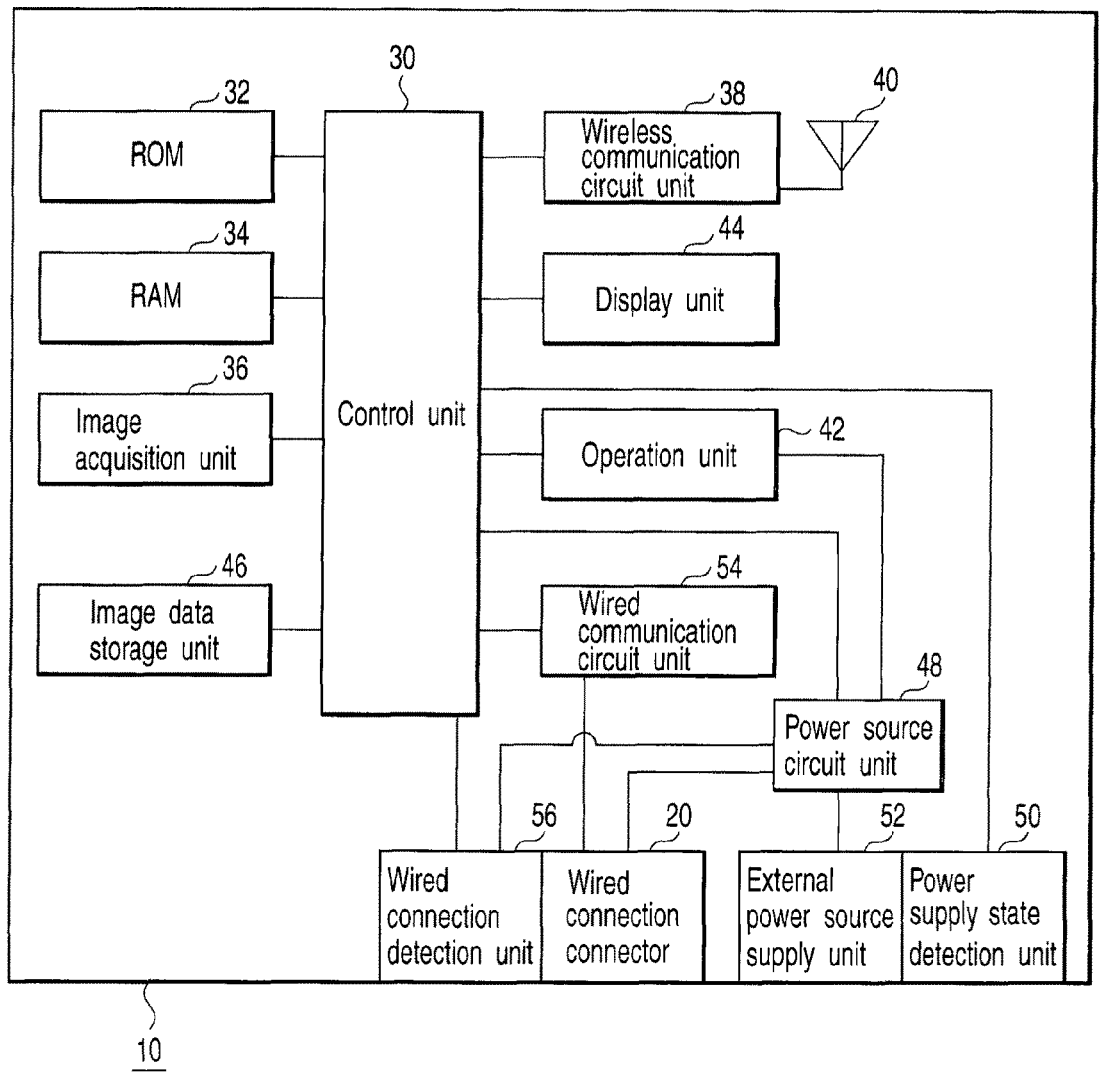
F I G. 2

MOBILE TERMINAL DEVICE AND NETWORK CONNECTION CONTROL METHOD

CROSS-REFERENCE TO RELATED APPLICATIONS

This application is based upon and claims the benefit of priority from prior Japanese Patent Application No. 2007-170835, filed Jun. 28, 2007, the entire contents of which are incorporated herein by reference.

BACKGROUND OF THE INVENTION

1. Field of the Invention

The present invention relates to a mobile terminal device configured to be connected to a network, and relates to a control method for connecting such a terminal device to the network.

2. Description of the Related Art

In recent years, a mobile terminal device such as an electronic still camera (hereinafter referred to as a digital camera) with a wireless communication interface to be wirelessly connected to a network such as LAN, etc., mounted thereon has become widely used.

A first object of mounting a wireless communication interface is to achieve data transfer without a wire.

Further, in recent years, a public wireless LAN service (called a hot spot, etc.) has been in the process of being prepared. Thus, transferring data of an acquired image to a server, etc., on the Internet from a place of visit via the foregoing LAN service by mounting the wireless communication interface on a portable terminal device itself such as a digital camera has been realized. This is a second object of mounting the wireless communication interface.

A third object is to connect the digital camera to a home (household electrical appliance) network through the wireless communication interface mounted on the mobile terminal device such as a digital camera. Thereby, the mobile terminal device becomes able to access image data stored in the digital camera without having to operate the digital camera from a personal computer (PC) or a television receiver, etc., connected to the network and becomes convenient.

However, an existing digital camera with the wireless communication interface mounted thereon has to issue a start instruction by means of a switch on the side of the digital camera in order to start an operation of the wireless communication interface and this causes a user inconvenience.

To solve the problem of the start by means of the switch, an always-on wireless communication interface is a possible approach. However, since wireless communication consumes a large volume of power even in reception, the always-on wireless communication interface poses a problem that a battery dies at short times. Even where constant connection to the network is enabled and PCs and television receivers connected to the networks are allowed to access the images stored in the digital camera, the above-mentioned short life of the battery becomes a problem.

Therefore, US 2006/0025105A1 has proposed a terminal device and a waiting operation control method which automatically starts a wireless waiting operation in addition to a start of supply of power form an external power source in order to solve the problem of power consumption and a troublesome operation of a start of waiting for wireless communication.

BRIEF SUMMARY OF THE INVENTION

According to a first aspect of the present invention, there is provided a mobile terminal device configured to connect to a network, comprising:
a wireless communication interface configured to connect to the network through wireless communication;
a wired communication interface configured to connect to the network one of directly and indirectly through wired connection;
a wired communication determination unit configured to determine whether or not communication with the network by the wired communication interface;
an external power source supply unit configured to be supplied power from the outside for one of charge and replacement of a built-in battery;
a power supply state detection unit configured to detect that a state, in which power is supplied from the outside to the external power source supply unit, is attained; and
a control unit configured to set a state in which the wireless communication interface is available regardless a determination result of the wired communication determination unit after the power supply state detection unit detects the state in which the power is supplied from the outside.

According to a second aspect of the present invention, there is provided a network connection control method in a mobile terminal device which includes a wireless communication interface configured to connect to the network through wireless communication, a wired communication interface configured to connect to the network one of directly and indirectly through wired connection, and an external power source supply unit configured to be supplied power from the outside for one of charge and replacement of a built-in battery, comprising:
detecting whether a state, in which power is supplied from the outside to the external power source supply unit, is attained; and
making the wireless communication interface is available regardless of possibility of communicating with the network by the wired communication interface after detecting the state in which the power is supplied from the outside.

According to a third aspect of the present invention, there is provided a mobile terminal device configured to connect to a network, comprising:
wireless communication interface means for connecting to the network through wireless communication;
wired communication interface means for connecting to the network one of directly and indirectly through wired connection;
wired communication determination means for determining whether or not communication with the network by the wired communication interface means;
external power source supply means for being supplied power from the outside for one of charge and replacement of a built-in battery;
power supply state detection means for detecting that a state, in which power is supplied from the outside to the external power source supply means, is attained; and
control means for setting a state in which the wireless communication interface means is available regardless a determination result of the wired communication determination means after the power supply state detection means detects the state in which the power is supplied from the outside.

According to a fourth aspect of the present invention, there is provided a network connection control method in a mobile terminal device which includes wireless communication interface means for connecting to the network through wireless communication, wired communication interface means for connecting to the network one of directly and indirectly through wired connection, and external power source supply means for being supplied power from the outside for one of charge and replacement of a built-in battery, comprising:

a step of detecting whether a state, in which power is supplied from the outside to the external power source supply means, is attained; and a step of making the wireless communication interface means is available regardless of possibility of communicating with the network by the wired communication interface means after detecting the state in which the power is supplied from the outside.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram depicting an electrical configuration of the digital camera;

DETAILED DESCRIPTION OF THE INVENTION

Hereinafter, an optimum form in order to embody the present invention will be described with reference to the drawings.

First Embodiment

Figure 1A:
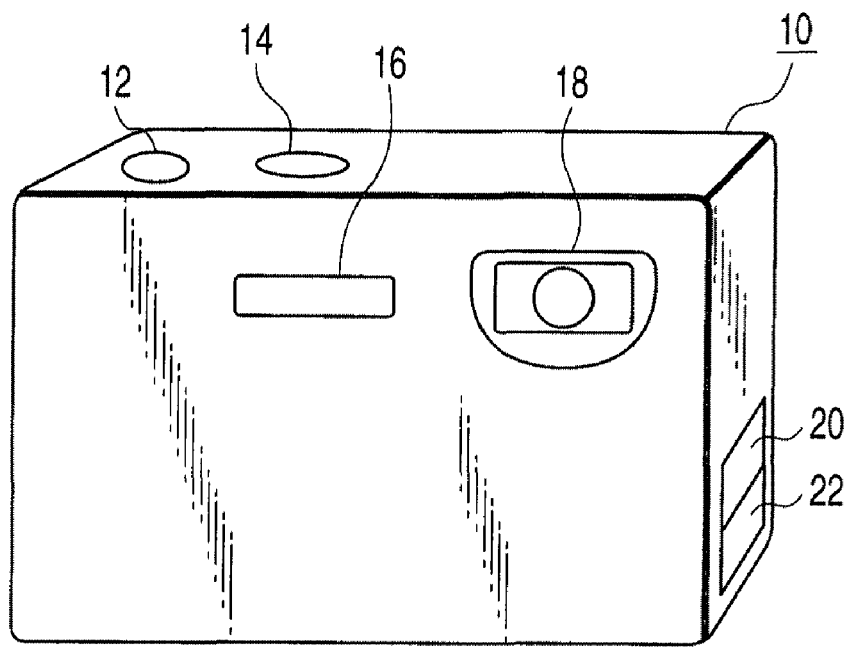
FIG. 1A is an outer appearance view viewed from the front face that is a subject side of a digital camera as a first embodiment of a mobile terminal device regarding the invention.
Figure 1B:
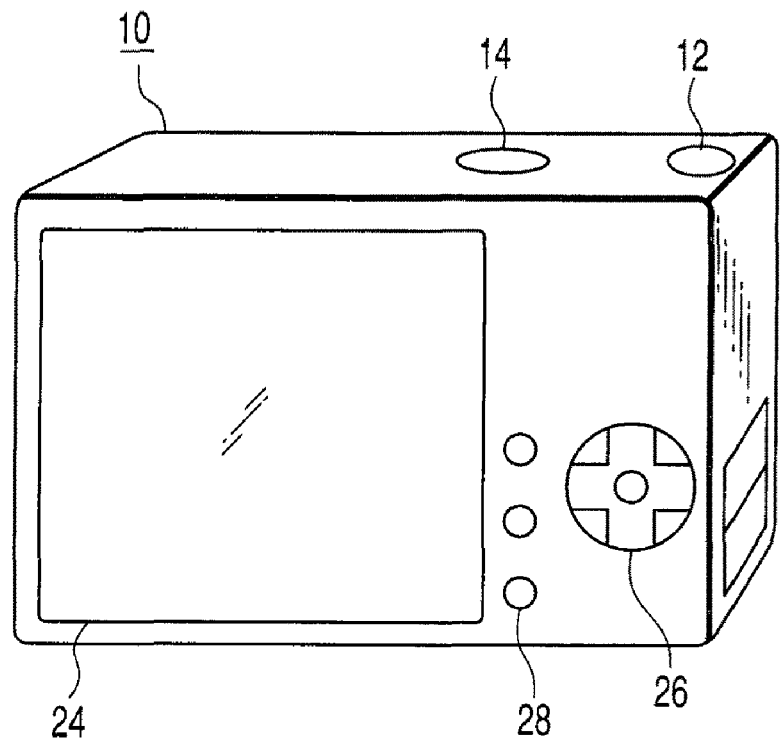
FIG. 1B is an outer appearance view viewed from a rear face that is an operation side of a user of the digital camera.

As shown in FIGS. 1A and 1B, on the right hand side of a user, a release button 12 for instructing image acquisition is provided on a top face of a digital camera 10 as the first embodiment of a mobile terminal device regarding the invention. A power switch 14 for turning on/off a power source of the digital camera 10 is provided at the next to the release button 12.

A flash lump 16 and a lens 18 for taking in image acquiring light in image acquisition are disposed on the front face of the digital camera 10.

A wired connection connector 20 for connecting a wire for wired communication and an external power source connector 22 for connecting a wire for external power source supply are disposed on a side face of the digital camera 10. However, in a case of a configuration in which power is supplied by a non-contact power transmission using electromagnetic induction, the external power source connector 22 is not disposed. Positions of the connectors 20, 22 are not limited to the side face; they may be disposed on other side faces, the positions may be on the rear face or the lower face of the digital camera 10. Further, the connectors 20, 22 may be uncovered or have lids.

A color liquid crystal display device 24 for displaying a subject image to be acquired, images and menu items, messages, etc., recorded in the digital camera 10 in a reproduction mode are disposed on the rear face of the digital camera 10. The rear face of the digital camera 10 is provided with a cross-shape cursor button 26 for instructing selection of the menu items or a change in operation state when the display device 24 displays menu items for setting various operation conditions of the digital camera 10. Further, the rear side has a menu button 28 for calling menu items for setting the various operation conditions of the digital camera 10. Other than this, the rear side includes a decision button for instructing items which have been selected from the menu items, and other buttons for instructing the operation state of the digital camera 10.

Although it is not shown, a mechanism for mounting a memory card to store the image data acquired with the digital camera 10 and a battery is provided for on the lower face of the digital camera 10.

As an electrical configuration of the digital camera 10, as shown in FIG. 2, the camera 10 includes a control unit 30, a ROM 32, RAM 34, an image acquisition unit 36, a wireless communication circuit unit 38, an antenna 40, an operation unit 42, a display unit 44, and an image data storage unit 46. Each of those units is mutually connected as shown in FIG. 2. The digital camera 10 has a power source circuit unit 48 to supply power to each of the units. Further, the digital camera 10 includes a power supply state detection unit 50, an external power source supply unit 52, a wired communication circuit unit 54, a wired connection detection unit 56 and the foregoing wired connection connector 20.

The control unit 30 is a control unit for applying sequence control to the digital camera 10 and operates in accordance with a program stored on the ROM 32.

The ROM 32 is a nonvolatile memory such as a flash ROM, and program data for controlling the digital camera 10, various items of setting information, and a file list for opening to public on the network (virtual directory) given later are stored on the ROM 32.

The RAM 34 functions as a temporal buffering for digital image data to be output from the image acquisition unit 36, as a work area to be used for computing by the control unit 30, and as an area for temporarily storing every kind of setting, etc.

The image acquisition unit 36 includes the lens 18 for focusing incident light, a photoelectric converter (CCD, CMOS sensor, etc.) for converting focused light into an electric signal, and an analog-digital converter (an AD converter)

for converting an analog electric signal output from the photoelectric converter into a digital electric signal.

The wireless communication circuit unit 38 is a wireless interface composed of a high-frequency circuit unit, an encoding/decoding circuit unit, a buffer memory in wireless communication, etc., which are necessary for the wireless communication. An antenna 40 is connected to the circuit unit 38.

The operation unit 42 includes buttons and switches, for example, the release button 12, the cursor button 26, the menu button 28, etc., and outputs states of the buttons and switches and changes in the states as electric signals.

The display unit 44 is composed of the color liquid crystal display device 24 and its control circuit.

The image data storage unit 46 is a storage device for storing acquired digital image data therein. The storage unit 46 may be configured to have a nonvolatile memory such as a built-in flash ROM, or may be configured to have a memory card, etc., detachable from a main unit of the digital camera 10, and either configuration can be used.

The power supply state detection unit 50 is, as mentioned later, a connection detection unit to detect that the power supply from the external power source becomes able.

The external power source supply unit 52 may be configured to directly supply power through the contact connection by means of the external power source connector 22, or may be configured to supply power through the non-contact power transmission using the electromagnetic induction, and either configuration can be used.

The wired communication circuit unit 54 is a wired communication interface which is connected with a wire through the connector 20 and communicates with an external device. The circuit unit 54 may directly connect to the network through an Ethernet (registered trademark) cable, or may indirectly connect to the network via a PC connected through a USB cable.

The wired connection detection unit 56 detects the connection of the cable (Ethernet cable or USB cable) to the wire connection connector 20. The detection unit 56 may have a configuration in which a mechanical switch is turned on by the connection of the cable to the connector 20, or may have a configuration in which a connection of a cable is sensed by a sensor using light, a magnetic field or an electric field, and either configuration may be used. Supply of power through the USB cable at the same time of communication is a possible approach. To cope with such a case, the detection unit 56 has a function to detect a voltage of a signal input from the cable connected to the connector 20 and to report a wired connection to the control unit 30. A method for detecting the wired connection by trying to actually perform wired communication at described timing and depending on the response is a possible approach.

The wire connection connector 20 holds the cable in wired connection and also transmits the signal from the cable to the wired communication circuit unit 54. The connector 20 connects the power to be supplied from the cable to the power source circuit unit 48.

The power source circuit unit 48 includes a battery, DC-DC converter and a battery check circuit, detects that the power switch 14 has been turned on, and supplies power to each of the aforementioned units. In a case in which the circuit unit 48 can be supplied power from the external power source supply unit 52, and in a case in which the circuit unit 48 can be supplied power in wired connection, the circuit unit 48 also has a function to charge the battery. Supplying the power supplied form the outside without intervention of the battery at the same time of the battery charge operation can be also used. Further, the circuit unit 48 has a function of detecting the remaining capacity of the battery.

The digital camera 10 having such a configuration has a function of transmitting the acquired digital image to other electronic device through wired communication or wireless communication.

The three usable patterns for the detection method by the power supply state detection unit 50 are described as follows.

1) A method for directly detecting a voltage to be applied to the external power source supply unit 52.

2) A method for detecting a magnetic filed or an electric field in a case in which the external power source supply unit 52 is configured to supply power by a non-contact power transmission unit electromagnetic induction.

3) A method for detecting that the supply of power becomes able by sensing mechanical engagement into an external power source supply device (not Shown) thorough a sensor (not shown) using a magnetic field or an electric field. More specifically, for example, if the external power source supply device is a cradle, an optical sensor senses the engagement into the cradle by means of an optical sensor. Or after embedding a magnet in the cradle, this method may sense the magnet by means of a magnetic sensor, or after embedding an RFID tag in the cradle, this method may sense the tag by reading the tag. The cradle may be actualized by a small sized connector, if its shape has a space which can perform the aforementioned sensing.

The following will describe operations of the wireless communication interface of the digital camera 10 configured in the aforementioned manner.

Figure 3:
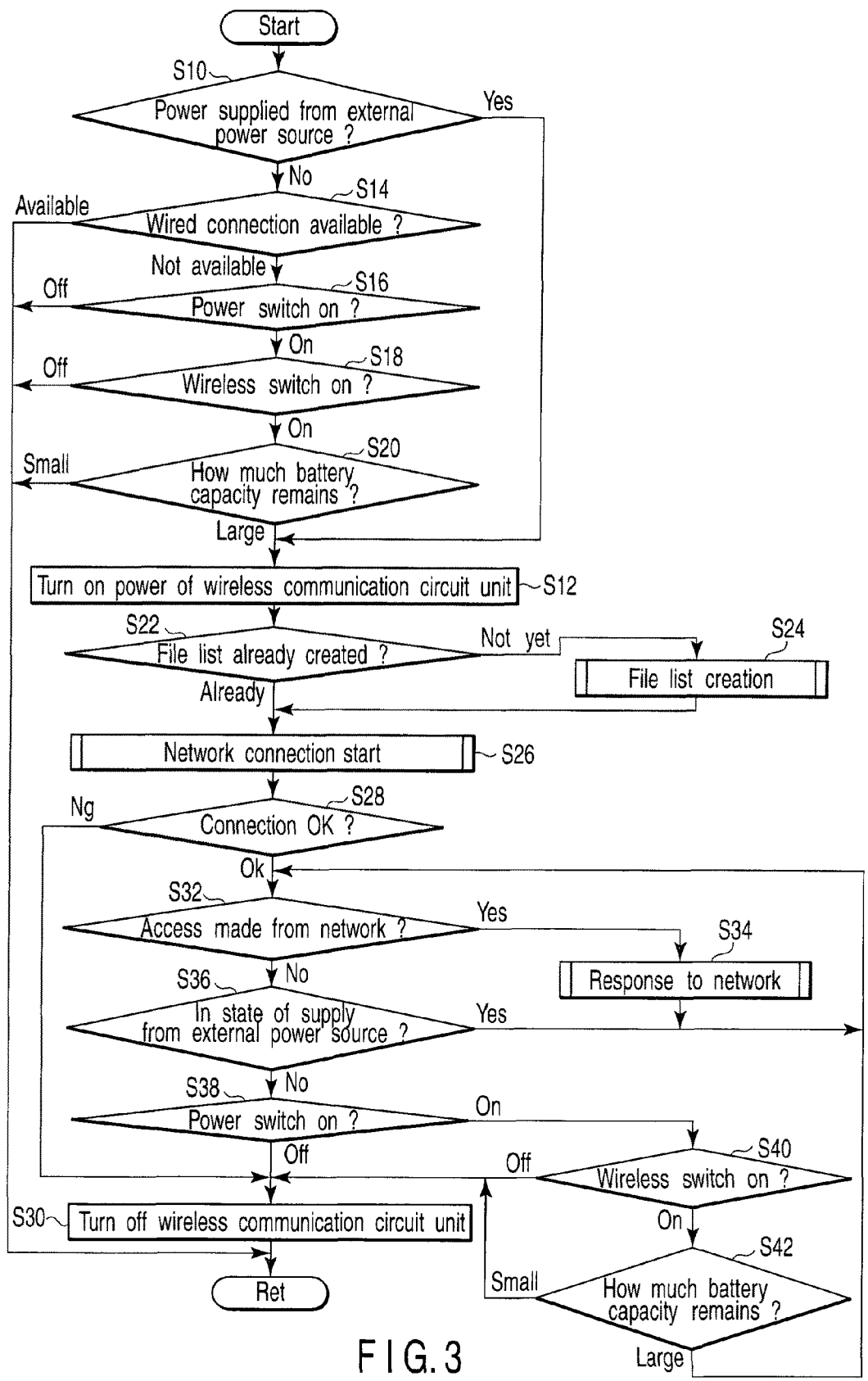
FIG. 3 is a flowchart of a wireless communication routine to be performed at prescribed timing in the digital camera.

A main routine of the digital camera 10 can separately perform the wireless routine shown in FIG. 3 at prescribed timing.

That is, in this routine, at first, the power supply state detection unit 50 detects whether or not the digital camera 10 is in a state in which the digital camera 10 may be supplied power from an external power source (Step S10). Here, if the supply from the external power source is detected, the digital camera 10 starts up the power sources of units required to make a wireless connection including the wireless communication circuit unit 38 and to access the inner data (Step S12). In other words, the circuit unit 38 is configured so as not to start its power source even if the power switch 14 is turned on, and in a case of detection of the supply of the power from the external power source, the power source of the circuit unit 38 starts its power source absolutely. In general, power on caused by a usual operation of the power switch 14, the power source circuit unit 48 supplies power to each of the functional units. Like this, in a case where the wireless communication is made by detecting the supply from the external power source, it is not always necessary to supply power to all units inside the digital camera 10. That is, it is enough to supply power only to the units (e.g., the wireless communication circuit unit 38, the control unit 30, the image data storage unit 46, etc.) which are necessary for making wireless communication and accessing the inner data.

Conversely, if it is determined that power is not supplied from the external power source in Step S10, the wired connection detection unit 56 determines whether or not the wired connection is available (Step S14). If the wired connection is available, it is assumed that the digital camera 10 utilizes the wired communication by means of the wired communication circuit unit 54, and the control unit 30 terminates this routine without starting up the power source of the wireless communication circuit unit 38. The control unit 30 then returns to the main routine to proceed to a procedure of wired communication which is not shown.

If the wired connection is not available, the control unit 30 determines whether the power switch 14 is on or not (Step S16). In a case that the power switch 14 is not on, the control unit 30 ends this routine to return the main routine. Conversely, if the power switch 14 is on, the control unit 30 further determines whether a wireless switch is turned on or not (Step S18). The wireless switch means a switch which gives an instruction to a device when an operator intends to arbitrarily make the wireless communication turn on. The wireless switch may be a switch composed of a GUI of the display unit 44 and the operation unit 42, or may be a switch composed of a single button. In the case of the latter, there is a low probability that something inside a bag touches the digital camera 10 which is put in the bag to turn on both the power switch 14 and the wireless switch. Therefore, there is little possibility that the power source of the wireless communication circuit unit 38 is started contrary to user's expectation and the digital camera 10 is connected to the network.

In a case where the wireless switch is not on, the wireless communication routine ends to return to the main routine. Conversely, in a case where the wireless switch is on, the control unit 30 further checks the remaining capacity by the power source circuit unit 48 (Step S20). If the remaining capacity of the battery is low, the control unit 30 terminates this routine to return to the main routine. If the remaining capacity of the battery is sufficiently high, namely if the remaining capacity is higher than a prescribed capacity, the wireless communication routine proceeds to Step S12 and starts up the power source of the wireless communication circuit unit 38. That is, when the user performs a usual start operation of the wireless communication, the power source of the wireless communication circuit unit 38 is started.

While the embodiment has described a case that the control unit 30 determines whether the wired connection is available, and if it is available, the digital camera 10 utilizes the wired connection and does not utilize the wireless communication, a major point of the invention is to make the wireless communication available regardless of the availability of the wired connection if the external power source can supply the power. Therefore, Step S14 may be omitted to turn on/off the wired connection without relation to the wireless connection, and an environment in which the wireless connection and the wired connection exist together may be established. Or, the wired connection may always be on, and a configuration, in which if the power source is connected, the wired connection may be turned off, is a possible approach.

The aforementioned Steps S16-S20 has described as one example of a procedure, all the Steps S16-S20 are not always necessary and some of them may be arbitrarily omitted. For instance, if the user expects to always turn on the wireless communication when the power switch 14 has been on, Step S18 may be omitted.

When the power is supplied to the wireless communication circuit unit 38 in Step S12, next, the control unit 30 confirms whether the file list for opening to public on the network has been created on the ROM 32 (Step S22). If the file list has not been created, the file list is created (Step S24). The file list is a list of files which have been stored in the image data storage unit 46.

If it is determined that the file list for opening to public on the network has been created in Step S22, or if the file list has been created in Step S24, next, the control unit 30 calls a network connection start subroutine to start the network connection through the wireless communication circuit unit 38 (Step S26).

Figure 4:
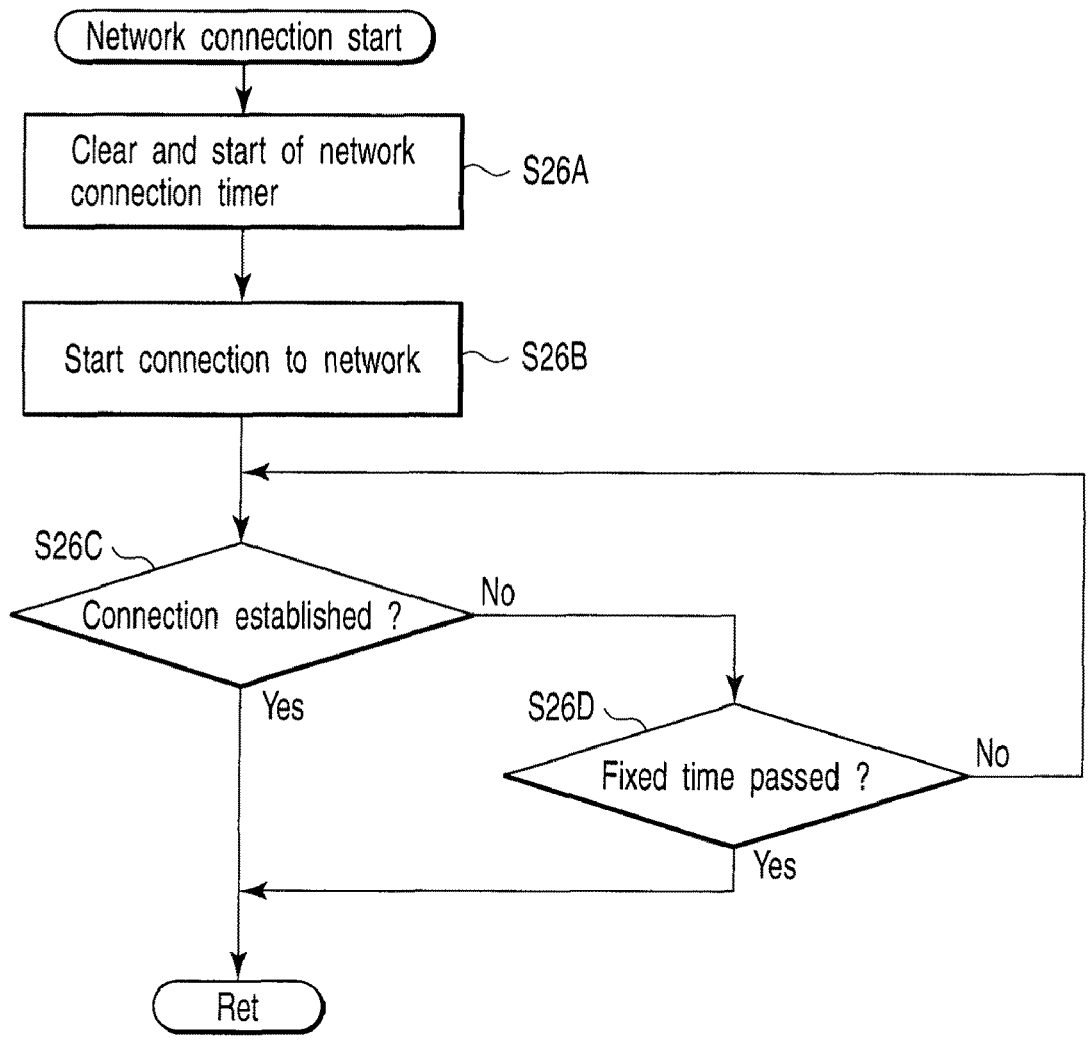
FIG. 4 is a flowchart of a network connection start subroutine of FIG. 3.

The network connection start subroutine starts after clearing a network connection timer (not shown) disposed in the control unit 30 as shown in FIG. 4 (Step S26A). After this, the connection to the network by means of the wireless communication circuit unit 38 is started (Step S26B). Then, it is determined whether or not the communication with the network through the circuit unit 38, namely it is confirmed whether or not the network connection has been established (Step S26C). If the network connection has been established, the control unit 30 ends this network connection start subroutine to return to a host routine.

Conversely, if the network connection has not been established yet, it is determined whether or not the time to be clocked with the network connection timer has passed a preset fixed time period (Step S26D). If it is determined that the fixed time period has not passed, the flowchart retunes to Step S26C. Conversely, if it is determined that the fixed time period has passed, the subroutine ends to return to the host routine.

Thus, after retuning to the routine shown in FIG. 3, it is determined that whether the connection to the network has been completed normally or not (Step S28). If the connection has not been completed normally, the control unit 30 turns off the power sources of the units which are necessary for the wireless connection including the wireless communication circuit unit 38 and for the access to the inner data (Step S30). The wireless communication routine then ends and returns to the main routine.

Conversely, if the connection to the network has been completed normally, access from a network side connected through wireless connection becomes able. Then, it is determined whether any access from the network has been made or not (Step S32). If any access from the network has made, namely if any access from an external device such as a television receiver connected to the network has been made, a response to network subroutine is called to give a reply in response to access content (Step S34). Then the wireless communication routine returns to Step S32. The detail of the response to network subroutine will be described later. Like this, the digital camera 10 replies responses for the request from the external device connected to the network if necessary.

In Step S32, if it is determined that any access has not been made from the network, the power supply state detection unit 50 detects whether or not the digital camera 10 is in a state to be supplied the power from the external power source (Step S36). If the supply from the external power source is detected, the wireless communication routine returns to Step S32. Namely, the digital camera 10 does not turn off the wireless communication connection during reception of power supply from the external power source in order to reduce the consumption of battery in wireless communication and achieve constant access from the network caused by always turning on the wireless communication.

Conversely, if it is determined that the external power source does not supply power, since it is a case in which the wireless communication has been turned on by the user's operation through Steps S14-S20, at first, it is determined whether or not the power switch 14 has been turned on (Step S38). If the Power switch 14 has not been turned on, the wireless communication routine proceeds to Step S30 to turn off the power sources required to the wireless communication including the wireless communication circuit unit 38 and to the access to the inner data. The control unit 30 then ends the wireless communication routine to retune to the main routine.

Meanwhile, in the case of the power switch SW14 being on, the control unit 30 further determines whether the wireless switch has been turned on or not (Step S40). If the wireless switch has not been turned on, the wire communication routine proceeds to Step S30 to turn off the power sources of the units needed for the wireless communication including the wireless communication circuit unit 38 and for the access to the inner data. The control unit 30 terminates this routine to retune to the main routine.

Furthermore, in a case of turning on of the wireless switch, the power source circuit unit 48 checks the remaining capacity of the battery (Step S42). If the remaining capacity of the battery is low, the wireless communication routine also proceeds to Step S30 and turns off the power sources of the units which are necessary to the wireless communication including the circuit unit 38 and the access to the inner data. The control unit 30 ends this routine to return to the main routine. If the remaining capacity of the battery is sufficiently high, the control unit 30 returns to Step S32.

The aforementioned Steps S38-S42 have described as one example, all the Steps S38-S42 are not always necessary and some of them may be arbitrarily combined. For instance, if it is assumed that the battery is used at the last moment for the wire communication without checking the remaining capacity of the battery, Step S42 may be omitted. If it is determined that the wireless switch has been turned on in Step S40, the processing may be returned to Step S32.

Figure 5:
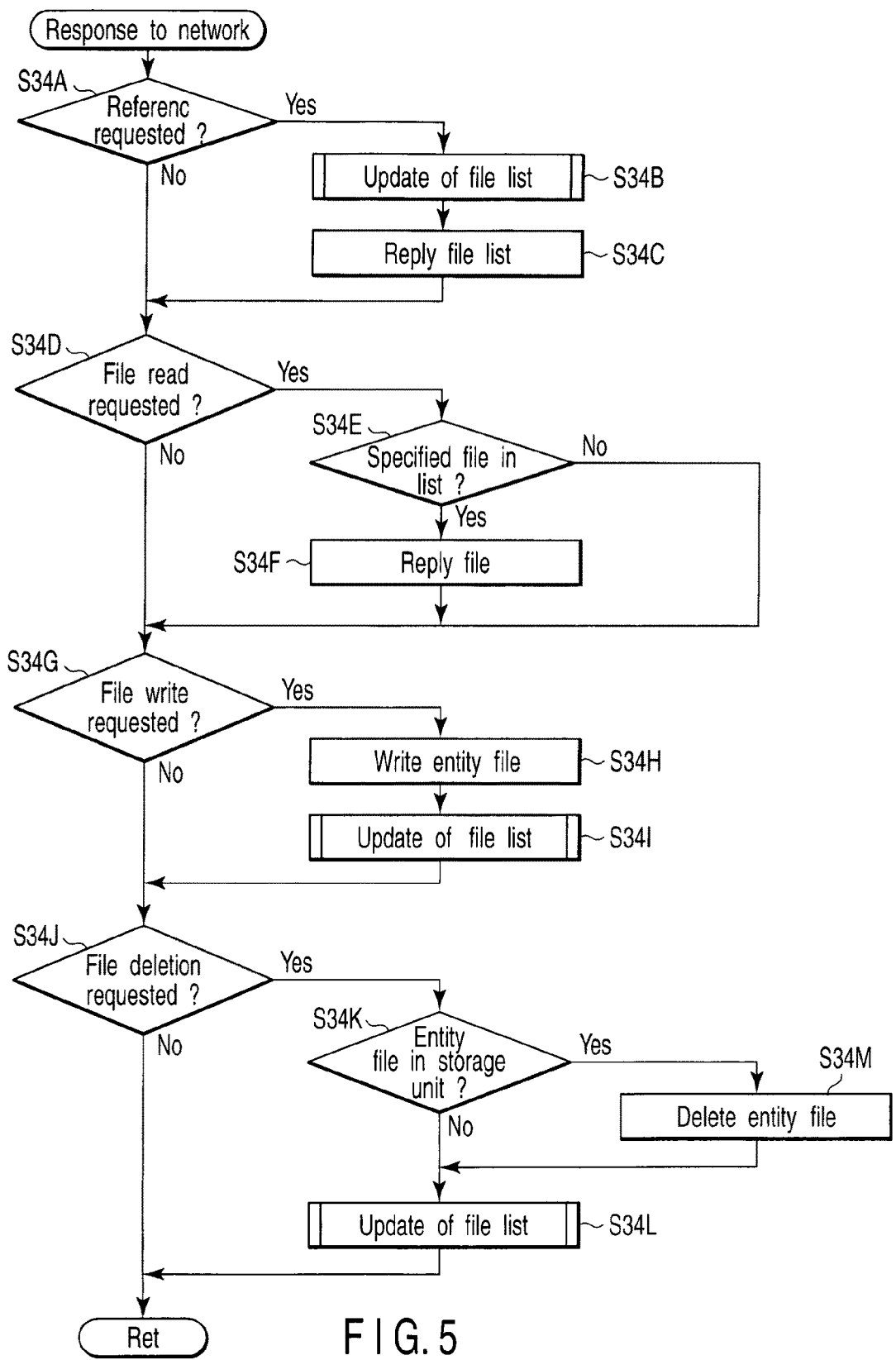
FIG. 5 is a flowchart of a network response subroutine of FIG. 3.

In the response to network subroutine to be called in Step S34, firstly, it is determined whether or not the access from the network is a reference request for the file list for the opening to the public on the network, as shown in FIG. 5 (Step S34A). If it is determined so, the control unit 30 updates the file list created on the ROM 32 so as to match with the content of the current image data storage unit 46 (Step S34B). The control unit 30 then replies the updated file list to the network (Step 34C). The external device such as a television receiver connected to the network comes to know the files stored in the digital camera 10 from the replied file list, and becomes able to make requests for reading, writing or deleting the files.

If the access from the network is not the reference request for the file list for the opening to the public on the network, it is determined whether or not the access is a file read request for requesting reading a specified file (Step S34D). If the access is so, it is determined whether or not the specified file is in the file list which has been created on the ROM 32 (Step S34E). If the specified file is in the file list, the control unit 30 reads an entity file of the file from the image data storage unit 46 to make a reply (Step S34F). Conversely, if such a required file is not in the file list, the wireless communication routine proceeds to the next step S34G. If the required file is not in the file list, an error message such as a 'File is not found.' may be replied although it is not especially shown. This case may occur in a case in which a corresponding-entity file has been deleted in accordance with an operation on the side of the digital camera 10 or a deletion request from other device on the network after sending the file list in Step S34C. In such a case, the external device on the network may obtain the update file list for the opening to public on the network by transmitting a reference request for the file list again to the digital camera 10.

If the access from the network is not the file read request, it is determined whether the access is a file write request or not (Step S34G). If the access is the file write request, the control unit 30 stores an entity of the file in the data storage unit 46 (Step S34H). The control unit 30 then updates the file list in relation to the relevant file (Step S34I).

If the access from the network is not the file write request, it is determined whether or not the access is a file deletion request for requiring deletion of a specified file (Step S34J). If the access is the file deletion request, it is determined whether or not the corresponding-entity file is in the image data storage unit 46 (Step S34K). If the corresponding-entity file is not in the storage unit 46, namely if the entity file has already been deleted, the control unit 30 updates the file list so as to match with a present situation (Step S34L). If the corresponding-entity file is in the storage unit 46, the control unit 30 deletes the entity file (Step S34M). After this, the control unit 30 proceeds to Step S34L to update the file list.

Needless to say, the file list for the opening to the public on the network is updated at every time when the digital camera 10 acquires an image to create a file of image data, and also at every time when an operation from the operation unit 42 deletes a file of unnecessary image data.

Deleting the file in response to an off operation of the power switch 14 and newly creating the file list when the power switch 14 is turned on is a possible approach. If the image data storage unit 46 is configured to have a memory card, etc., which is detachable from the main unit of the digital camera 10, as the image data storage unit 46, replacement of the memory card makes contents of the file list and of the storage unit 46 completely different from each other. In this case, re-creating the file list by turning on/off the power switch 14 enables avoiding the occurrence of such a difference.

Of course, creating and storing the file list for each memory card while associating with IDs, etc., of the memory cards may be acceptable. With the creating and storing performed, there is no need to re-create the file list for every time when the power switch 14 is turned on/off.

As mentioned above, according to the first embodiment, if the power is supplied from the external power source, regardless of the presence or absence of a connection through a wired line, and regardless of the remaining capacity of the battery, etc., it is assumed that the digital camera 10 is present indoor or a range in which the home (household electrical appliance) network is available, the digital camera 10 automatically starts the wireless communication circuit unit 38. Thereby, a reception waiting state is maintained so that the file of the acquired image data stored in the image data storage unit 46 can be accessed. Thus the user's convenience is enhanced. That is, even when a relay device of a wired LAN or a PC on a halfway of a wired line is not operated, the digital camera 10 is connected to the home network, etc., through the wireless connection, becomes able to access the inner data from an external device such as a PC and a television receiver, namely from the side of the network.

If the power is not supplied from the external power source, it is assumed that the digital camera 10 is not in the range in which the home network is available, and the operation of the wireless communication circuit unit 38 is stopped. Thereby, since the amount of the consumed power may be reduced, such a case may prevent the life time of the digital camera 10 from becoming short.

Second Embodiment

Next, the second embodiment of the invention will be described.

In recent years, a flash ROM such as a detachable SD memory card may be used as an image data storage unit 46 of a digital camera 10. The capacity of the flash ROM has become large at a low cost in recent years. The flash ROM can be used not only in a digital camera but also in various devices such as a music reproduction device, and a PC. Therefore, in using the flash ROM as the storage device 46 for a mobile terminal device such as a digital camera 10, there is a possibility that not only files of image data acquired by the user but also a various kinds of files such as music, character information, video and a motion image are each mixed.

Then, in the second embodiment, the mobile terminal device restricts access from a network side to files stored in an image data storage unit 46 by devising the file list for opening to public on a network to be updated in foregoing Steps S34B, 34I, 34L so as to improve user's convenience.

Therefore, the configuration and operations of the mobile terminal device regarding the second embodiment are basically the same as those of the configuration and operations of the mobile terminal device regarding the first embodiment. The following will described only the components differing from those of the first embodiment.

It is assumed that in operation for image acquisition, after the image data acquired by a image acquisition unit 36 is converted into a prescribed format such as JPEG which is compliant with, for example, a DCF standard that is a normal file system standard for a digital camera, image acquisition device information is added to the image data and the image data is stored in the storage unit 46. In the embodiment, it is assumed that opening files to be released to the public on the network are only image files which have been acquired with the digital camera 10. Methods for identifying image files acquired with the digital camera 10 are described as follows.

1) It is identified by means of metadata such as an exchangeable image file format (Exif). For instance, since the Exif data which is compliant with an Exif standard that is a normal file format standard for a digital camera includes image acquisition device information, the method utilizes this information. Not only the Exif data but also metadata differing from the Exif data may be embedded at a part of an image data file.

2) In storing the acquired image data in the storage unit 46, the image data is stored in a specified folder to make it possible to access only the data stored in the specified folder from the network. Further, image data which has been acquired with the same type of image acquisition devices as that of the digital camera may be omitted by naming the specified folders for each camera. A method for embedding individual camera information into this folder name is an example, and any method, for example, a method for setting another associated storage area can be used as long as the folder is associated with the individual camera information.

Figure 6:
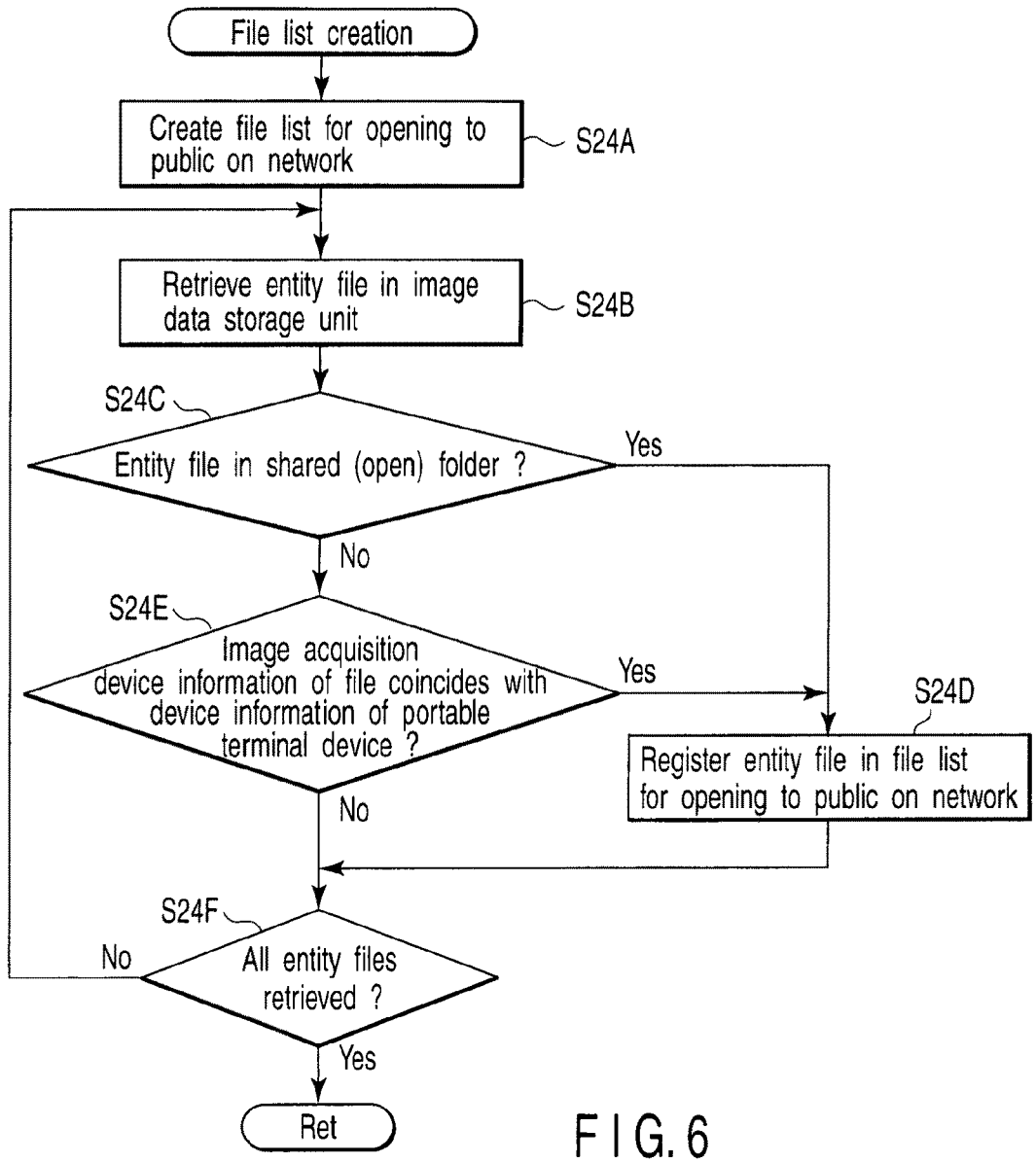
FIG. 6 is a flowchart of a file list creation subroutine in a digital camera as a second embodiment of the mobile terminal device regarding the invention.

In the digital camera 10 of the second embodiment of the mobile terminal device regarding the invention, in a file list creation subroutine to be called in the foregoing Step S24, as shown in FIG. 6, at first, the digital camera 10 creates an empty file list for opening to the public on a network on the ROM 32 (Step S24A).

Then, the digital camera 10 retrieves an entity file in the storage device 46. (Step S24B). Here, it is determined whether or not the retrieved entity file is a file in a shared folder, namely in an open folder (Step S24C). If the entity file is the file in the shared (open) folder, the file is registered in the created file list (Step S24D).

Figure 7A:
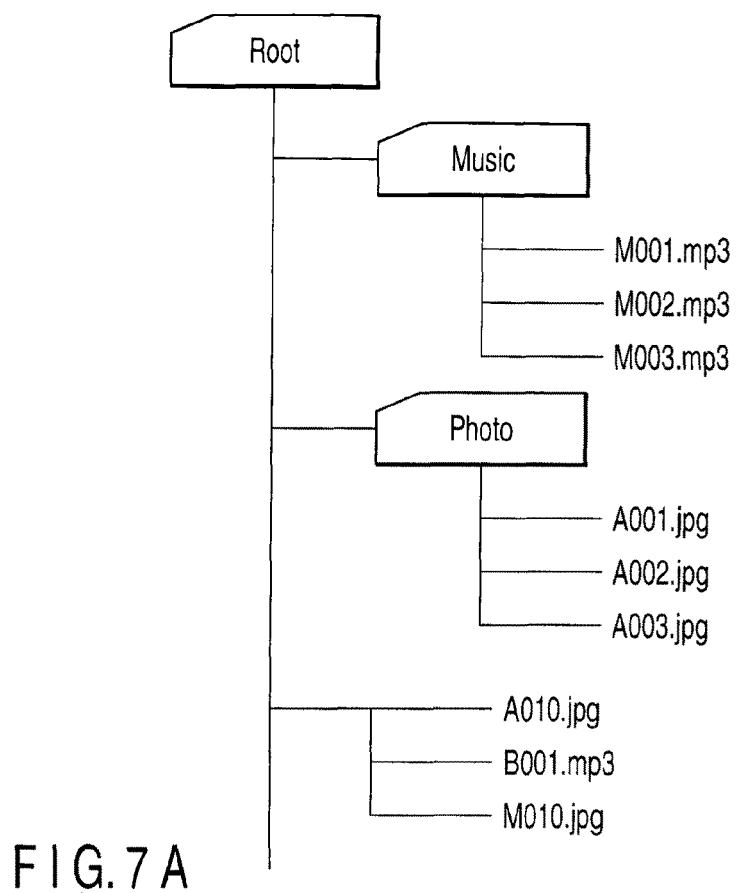
FIG. 7A is a view depicting a file storage configuration of an image data storage unit of the second embodiment.
Figure 7B:
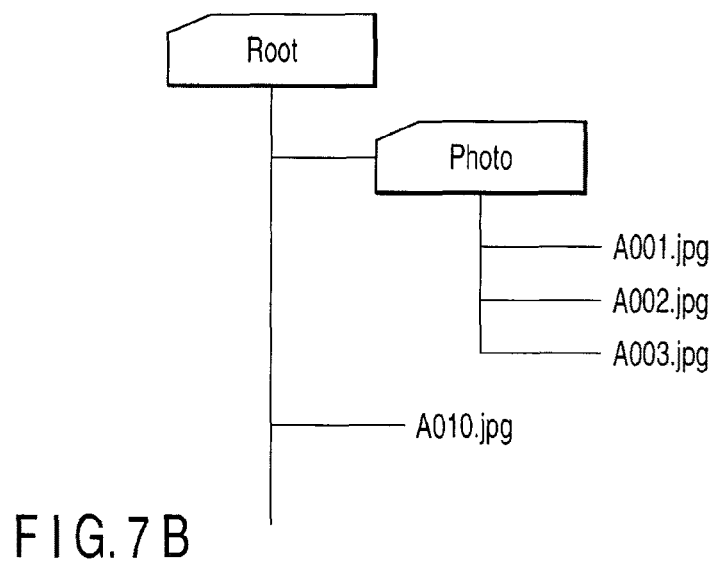
FIG. 7B is a view depicting an example of a file list for opening to public on a network of the second embodiment.

As mentioned above, the memory card as the storage unit 46 may be shared with a terminal such as a music player. As shown in FIG. 7A, image data, other than image data (e.g., of a file name 'A*.jpg' [* is optional]) acquired with the digital camera 10, such as music data (e.g., of a file name '*.Mp3') may be stored in the memory card. Therefore, it is determined whether or not the entity file is a file in a prescribed specific shared (open) folder (e.g., a 'Photo' folder), and if it is so, the entity file is registered in the file list as shown in FIG. 7B**.

In the foregoing Step S24C, if it has been determined that the entity file is not a file in the shared (open) folder, further, it is determined whether the image acquisition device information of the retrieved entity file coincides with the device information of the digital camera 10 (Step S24E). If both the information coincides with each other, the subroutine proceeds to Step 24D given above to register the entity file in the file list for the opening.

In other words, even if the entity file is not a file in the predetermined specific shared (open) folder ['Photo' folder], the entity file may be a file of the image data, which has acquired with the digital camera 10, like a file of a name 'A010.jpg' stored in a 'Root' folder of FIG. 7A. If the entity data is an image data like this, the entity file is registered in the file list as shown in FIG. 7B. Since the file, which is created by other device does not coincide with the device information of the digital camera 10 as shown in FIG. 7A as a file name 'M010.jpg', the files created by other devices is not register in the file for opening as shown in FIG. 7B.

It is determined whether or not all the entity files stored in the storage unit 46 have been retrieved (Step S24F). If all the entity files have not been retrieved yet, the subroutine returns to Step 24B. Thereby, all the entity files stored in the storage unit 46 are applied the operations in Steps S24B-S24E.

After retrieving all the entity files stored in the storage unit 46, the control unit 30 ends this file list creation subroutine to return to the host routine.

Figure 8:
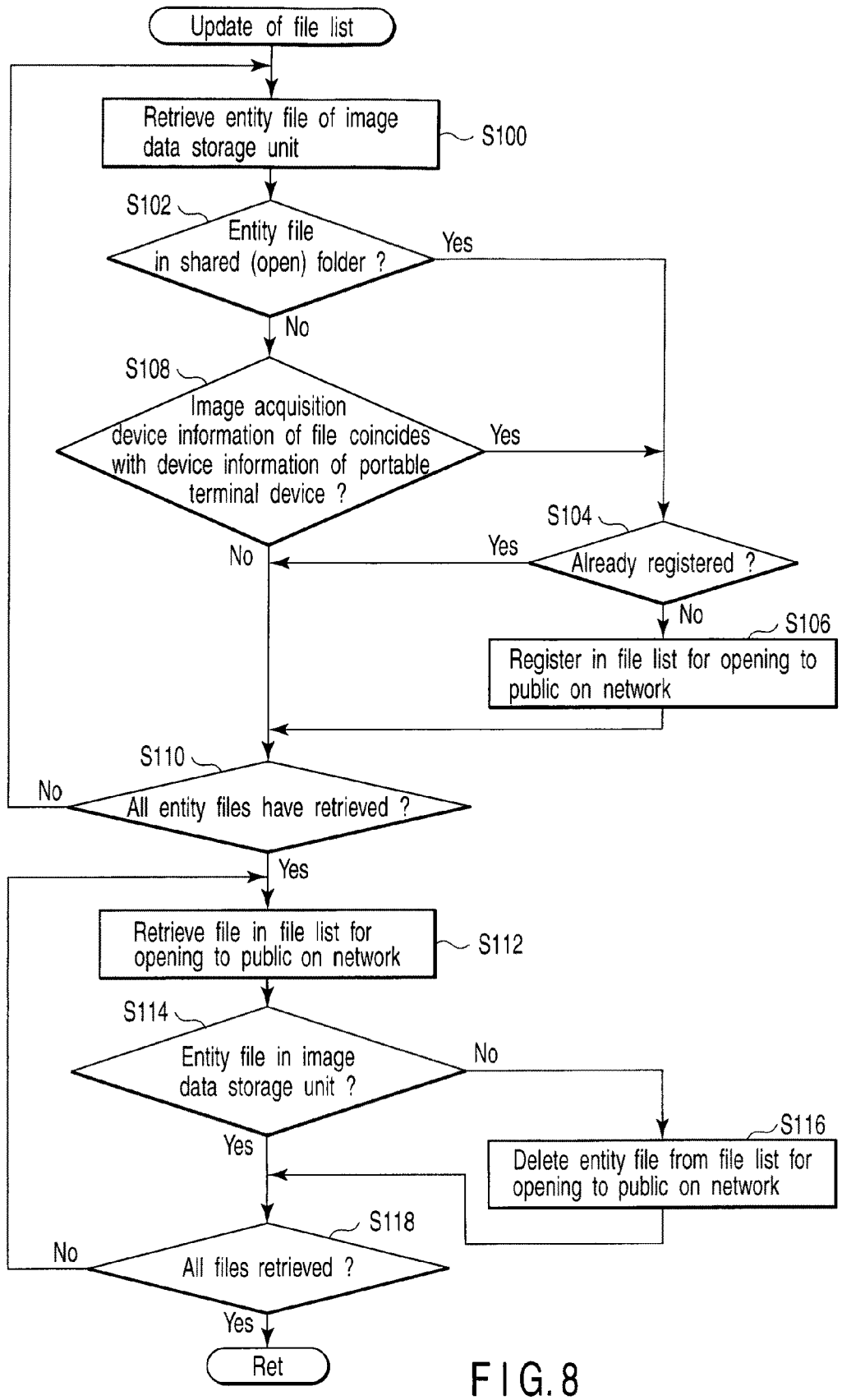
FIG. 8 is a flowchart of a file list update subroutine of the second embodiment.

In the update of file list subroutine to be called in Step S34B, S34I, or S34L, firstly, the entity file in the storage unit 46 is retrieved as shown in FIG. 8 (step S100). Here, it is determined whether the retrieved entity file is a file in the shared (open) folder or not (Step S102). If the entity file is in the shared (open) folder, furthermore, it is determined whether the entity file has already been registered in the file list or not (Step S104). If the file has not been registered yet, the retrieved entity file is registered (Step S106).

In Step S102, if it is determined that the entity file is not in the shared (open) folder, further, it is determined whether or not the image acquisition device information of the retrieved entity file coincides with the device information of the digital camera 10 (Step S108). If they coincide with each other, the subroutine proceeds to Step S104 to confirm whether the entity file has not been registered, and the file has not been registered, the control unit 30 registers it in the file list.

The control unit 30 determines whether or not all the entity files stored in the storage unit 46 have been retrieved (Step S110). If all the entity files have not been retrieved yet, the control unit 30 returns to Step S100 then performs operations in Steps S100-S108 given above for all the entity files stored in the image data storage unit 46.

Thus, retrieving all the entity files stored in the storage unit 46 enables additionally registering the entity files not registered yet in the file list.

After this, the update subroutine proceeds to processing for deleting the files which have been registered in the file list but their entity files have been deleted from the file list.

In other words, the control unit 30 retrieves the file on the file list (Step S112), and confirms whether or not the retrieved file is present as entity file in the image data storage unit 46 (Step S114). If the corresponding-entity file is not present therein, the relevant file is deleted from the file list for the opening (Step S116).

It is determined whether all the files registered in the file list for the opening have already been retrieved or not (Step S118). If all the entity files have not been retrieved yet, the control unit 30 returns to Step S112 then performs the operations in Step S112-S116 given above to all the files registered in the file list for the opening. After the performances have been done to all the files, the control unit 30 ends this update of file list subroutine to return to the host routine.

As mentioned above, on the second embodiment, the side of the digital camera 10 includes a function of restricting access any image data other than ones acquired with the digital camera 10 in accessing from the network. Thereby, the data which is accessible from the network side is reduced and the mobile terminal device may simply select the data to be referred from the network side.

That is, if the digital camera 10 is used as a camera in a general way, the mobile terminal device focuses attention to that the user extremely desires to watch the images acquired with the digital camera 10, and makes it possible to externally access only the image files acquired with the digital camera 10 in accessing from the network side. Thereby, the mobile terminal device can reduce the number of files which are visible from the network side and quickly find the desired file.

Further, in a case in which access from outside to the copyrighted files is allowed, the portable terminal device has to cope with various copyright protection functions. However, the mounting of these functions are complicated and results in an increase in a product cost. Therefore, it is a merit to simply select and eliminate files to be copyrighted and to make it impossible to access the files. However, copyright protection functions develops day by day, and there is a need to revise a selection method in accordance with the development of the protection functions for reading and selecting characteristics of the copyrighted files. In the second embodiment, the mobile terminal device may limit accessible filed to only data which does not produce any problem (with low possibility of occurring copyright problem). Then, the mobile terminal device can simply select to eliminate the data to be copyrighted; this is preferable for a beginner.

While in FIGS. 6 and 8, the embodiment have described in a form in which the foregoing two identification methods are realized as an identification method of files to be opened, of course, only either method can be used. For instance, if it is intended to open only the files in the shared (open) folder, the mobile terminal device becomes also able to access files without any problem on copyright such as music files and text files created by the user of the digital camera's user from the network.

While the invention has described on the basis of the aforementioned embodiments, the invention is not limited to the aforementioned embodiments, it is needless to say that this invention may be embodied in various forms without departing from the spirit or scope of the general inventive concept thereof.

For instance, in the first and the second embodiments, in the case where the external power source supply unit 52 enables supply power, regardless of the possibility of network communication by means of the wired communication circuit unit 54, the wireless communication circuit unit 38 is started to make wireless network communication. However, it is needless to say that an environment, in which wireless communication and wired communication coexist therein, may be established, and also may switchover to the wired connection in the case where wireless network connection is not established.

In connecting to the network through the wired communication circuit unit 54, the portable terminal device may perform the same access restriction as that of the second embodiment.

Or in the access from the outside is not always restricted, as regards the wired communication, the mobile terminal device indirectly connects to the network through the PC by means of a USB connection. Namely, the wired connection is not directly connected to the network. Conversely, if the wireless connection is directly connected to the network, only in the case of the wireless connection, the access restriction is performed. Thereby, only the image data may be viewed in referring from the network, and when content is viewed by means of the PC, all the files can be referred and the portable terminal device becomes more convenient.

While the embodiments have described that the wireless communication circuit unit 38 is turned on in the case where the wired connection is not available, if the power is not supplied from the external power source, it is preferable to check the remaining capacity of the battery, and not to turn on the circuit unit 38 if the remaining capacity is not high. However, if the power supply can be performed through the wired connection like the USB connection, the restriction for the circuit unit 38 is not limited as given above.

In general, to supply the power by means of the power switch 14, the power is supplied to each functional unit from the power source circuit 48. However, when the external power source connection is detected to turn on the wireless communication circuit 38, it is not needed to supply the power to all the units the inside of the digital camera 10. In this case, it is enough to supply the power only to the units (e.g., only to the wireless communication circuit unit 38, the control unit 30, the image data storage unit 46, etc.) which are required for the wireless connection and the access to the inner data.

While the aforementioned embodiments have described by taking the digital camera 10 as examples, the invention may be applicable to other mobile terminal device such as a mobile information terminal (PDA), a music reproduction device with a wireless function. As regards a part which is derived from the acquired image data can be applicable not only to the digital camera 10 but also to other mobile terminal device with an image acquisition function such as a cellular phone with a camera and a PDA with a camera.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A mobile terminal device configured to connect to a network, comprising:
    a wireless communication interface configured to connect to the network through wireless communication;
    an external power source supply unit configured to be supplied power from an outside of the mobile terminal device for one of charge and replacement of a built-in battery;
    a power supply state detection unit configured to detect that a state, in which power is supplied from the outside to the external power source supply unit, is attained;
    a power on/off switch which is operated by an operator and configured to turn on/off power of the mobile terminal device;
    a wireless connection on/off switch which is operated by an operator and configured to turn on/off a wireless function performed by the wireless communication interface; and
    a control unit configured to set a state in which the wireless function performed by the wireless communication interface is available regardless of both the power on/off switch and the wireless connection on/off switch being turned off from a previous on state in a case where the power supply state detection unit detects the state in which the power is supplied from the outside to the external power source supply unit is attained.

2. The device according to claim 1, further comprising:
a battery remaining capacity detection unit configured to detect a remaining capacity of the built-in battery, wherein
the control unit makes the wireless communication interface available regardless a detection result of the battery remaining capacity detection unit after the power supply state detection unit detects that the state, in which the power is supplied from the outside to the external power source supply unit, is attained.

3. The device according to claim 1, wherein the power supply state detection unit outputs a signal on the basis of a detection result of a voltage to be applied to the external power source supply unit.

4. The device according to claim 1, wherein the power supply state detection unit is disposed at a prescribed position which is relative to the external power source supply unit, and utilizes any one of light, a magnetic field and an electric field to output a signal on the basis of a detected result that an external power source has been electrically connected to the external power source supply unit.

5. The device according to claim 1, wherein the control unit makes the wireless communication interface available during the power supply state detection unit detects a state in which the power is supplied from the external power source.

6. The device according to claim 1, wherein the control unit releases setting of the state in which the wireless communication interface is available when the power supply state detection unit detects interruption of power supply from the outside.

7. The device according to claim 1, wherein the control unit releases the setting of the state in which the wireless communication interface is available when communication with the network through the wireless communication interface is not established within a prescribed time period.

8. The device according to claim 1, further comprising:
a wired communication interface configured to connect to the network by at least one of a direct wired connection and an indirect wired connection;
an image acquisition unit configured to acquire an image of a subject;
a storage unit configured to store data of the image of the subject acquired by the image acquisition unit; and
an access restriction unit configured to restrict access from a side of the network to the data of the image stored in the storage unit through one of an available wireless communication interface and an available wired communication interface.

9. The device according to claim 8, wherein the access restriction unit restricts access from a side of the network only to a part of data to be stored in the storage unit including the data of the image acquired by the image acquisition unit when the storage unit stores data other than the data of the image acquired by the image acquisition unit.

10. The device according to claim 9, wherein the access restriction unit restricts access from a side of the network only to the data of the image acquired by the image acquisition unit.

11. The device according to claim 8, wherein the power is supplied only to a part of the mobile terminal device including at least the storage unit and the access restriction unit when the wireless communication interface is made available.

12. A network connection control method in a mobile terminal device which includes a wireless communication interface configured to connect to the network through wireless communication, an external power source supply unit configured to be supplied power from an outside of the mobile terminal device for one of charge and replacement of a built-in battery, a power on/off switch which is operated by an operator and configured to turn on/off power of the mobile terminal device, and a wireless connection on/off switch which is operated by an operator and configured to turn on/off a wireless function performed by the wireless communication interface comprising:
detecting whether a state, in which power is supplied from the outside to the external power source supply unit, is attained; and
making the wireless function performed by the wireless communication interface available regardless of both the power on/off switch and the wireless connection on/off switch being turned off from a previous on state in a case of detecting the state in which the power is supplied from the outside to the external power source supply unit is attained.

13. A mobile terminal device configured to connect to a network, comprising:
wireless communication interface means for connecting to the network through wireless communication;
external power source supply means for being supplied power from an outside of the mobile terminal device for one of charge and replacement of a built-in battery;
power supply state detection means for detecting that a state, in which power is supplied from the outside to the external power source supply means, is attained;
a power on/off switch means which is operated by an operator and configured to turn on/off power of the mobile terminal device;
a wireless connection on/off switch means which is operated by an operator and configured to turn on/off a wireless function performed by the wireless communication interface means; and
control means for setting a state in which the wireless function performed by the wireless communication interface means is available regardless of both the power on/off switch means and the wireless connection on/off switch means being turned off from a previous on state in a case where the power supply state detection means detects the state in which the power is supplied from the outside to the external power source supply means is attained.

14. A network connection control method in a mobile terminal device which includes wireless communication interface means for connecting to the network through wireless communication, external power source supply means for being supplied power from an outside of the mobile terminal device for one of charge and replacement of a built-in battery, a power on/off switch means which is operated by an operator and configured to turn on/off power of the mobile terminal device, and a wireless connection on/off switch means which is operated by an operator and configured to turn on/off a wireless function performed by the wireless communication interface means comprising:
a step of detecting whether a state, in which power is supplied from the outside to the external power source supply means, is attained; and
a step of making the wireless function performed by the wireless communication interface means available regardless of both the power on/off switch means and the wireless connection on/off switch means being turned off from a previous on state in a case of detecting the state in which the power is supplied from the outside to the external power source supply unit is attained.

15. The device according to claim 1, wherein
the control unit is configured to set a state in which the wireless function performed by the wireless communication interface is available only in a case where both the power on/off switch and the wireless connection on/off switch are turned on, in a case where the power supply state detection unit does not detect the state in which the power is supplied from the outside to the external power source supply unit is attained.

16. The device according to claim 1, further comprising:
a wired communication interface configured to connect to the network by at least one of a direct wired connection and an indirect wired connection, and wherein
the control unit is configured to set a state in which the wireless function performed by the wireless communication interface is available only in a case where the wired communication interface is unavailable, in a case where the power supply state detection unit does not detect the state in which the power is supplied from the outside to the external power source supply unit is attained.

17. The device according to claim 1, further comprising:
a battery remaining capacity detection unit configured to detect a remaining capacity of the built-in battery, wherein
the control unit makes the wireless communication interface available only in a case where the battery remaining capacity detection unit detects that the remaining capacity of the battery is at least a predetermined capacity, in a case where the power supply state detection unit does not detect the state in which the power is supplied from the outside to the external power source supply unit is attained.

* * * * *